United States Patent
Przybyla et al.

[11] Patent Number: 5,982,781
[45] Date of Patent: Nov. 9, 1999

[54] PROCESS FOR INFORMATION TRANSMISSION IN A BUS SYSTEM HAVING SEVERAL PARTICIPANTS

[75] Inventors: Bernd Przybyla, Schwiebendingen; Juergen Pischke, Weissach; Janina-Ursula Langer, Leonberg, all of Germany

[73] Assignee: Robert Bosch GmbH, Stuttgart, Germany

[21] Appl. No.: 08/157,198

[22] PCT Filed: Apr. 6, 1992

[86] PCT No.: PCT/DE92/00456

§ 371 Date: Dec. 9, 1993

§ 102(e) Date: Dec. 9, 1993

[87] PCT Pub. No.: WO93/01668

PCT Pub. Date: Jan. 21, 1993

[30] Foreign Application Priority Data

Jul. 4, 1991 [DE] Germany ............ 41 22 084

[51] Int. Cl.⁶ .................................. H04Q 1/00
[52] U.S. Cl. .......................... 370/462; 395/200.55
[58] Field of Search ............ 340/825.5, 825.16; 370/85.3, 93, 462; 395/200.55

[56] References Cited

U.S. PATENT DOCUMENTS

| | | | |
|---|---|---|---|
| 4,063,220 | 12/1977 | Metcalfe | 370/93 |
| 4,584,575 | 4/1986 | Ryckeboer | 340/875.5 |
| 4,737,783 | 4/1988 | Tanaka | 340/825.5 |
| 4,975,907 | 12/1990 | Dutruel et al. | |
| 5,001,642 | 3/1991 | Botzenhardt et al. | |

FOREIGN PATENT DOCUMENTS

| | | |
|---|---|---|
| 0341166 | 11/1989 | European Pat. Off. |
| 8204366 | 12/1982 | WIPO |

OTHER PUBLICATIONS

F. Effenberger, "Serieller Bus zur Kopplung intellingenter Messysteme", pp. 387 & 388.

*Primary Examiner*—Brian Zimmerman
*Attorney, Agent, or Firm*—Michael J. Striker

[57] ABSTRACT

The process for serially transmitting information entities over a serial bus between subscribers (ECU1 to ECU4) at a common transmission rate for all subscribers, includes providing the information entities with a start bit (Sta) at a beginning of transmission of each of the information entities; waiting to transmit the information entities on the bus from each subscriber until after a bus monitoring time period ($T_U$) assigned to each subscriber has elapsed; setting a flag after a subscriber receives one of the information entities; monitoring a logic state of the serial bus during a bus monitoring time period ($T_U$) at a monitoring rate sufficiently high so that receipt of each information entity is detected during reception of a start bit (Sta); each subscriber determining the state of the flag after expiration of the bus monitoring period ($T_U$); and only then transmitting the information entities from the subscriber if the subscriber does not detect that the flag is set during the bus monitoring time period ($T_U$).

12 Claims, 4 Drawing Sheets

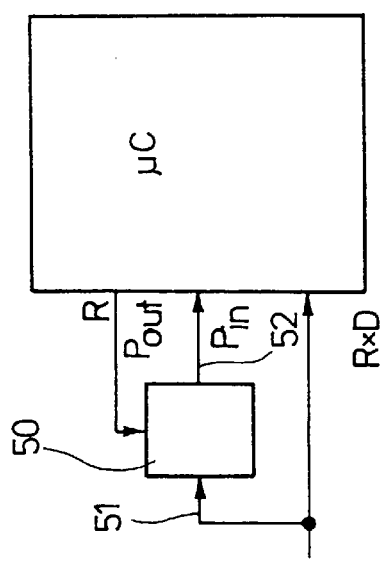
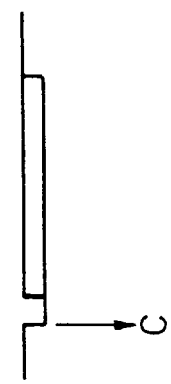
Fig. 3
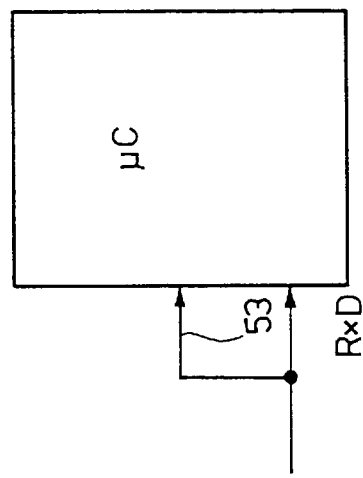
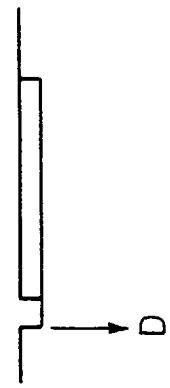
Fig. 4
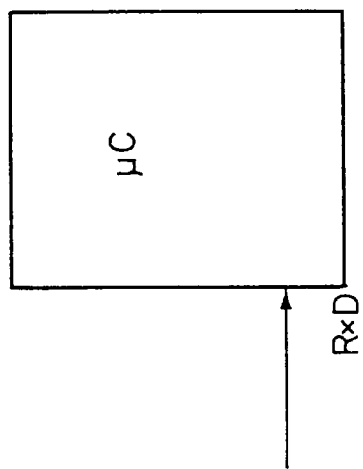
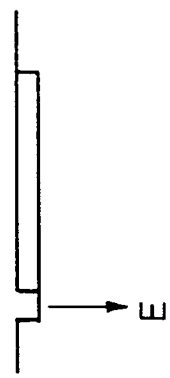
Fig. 5

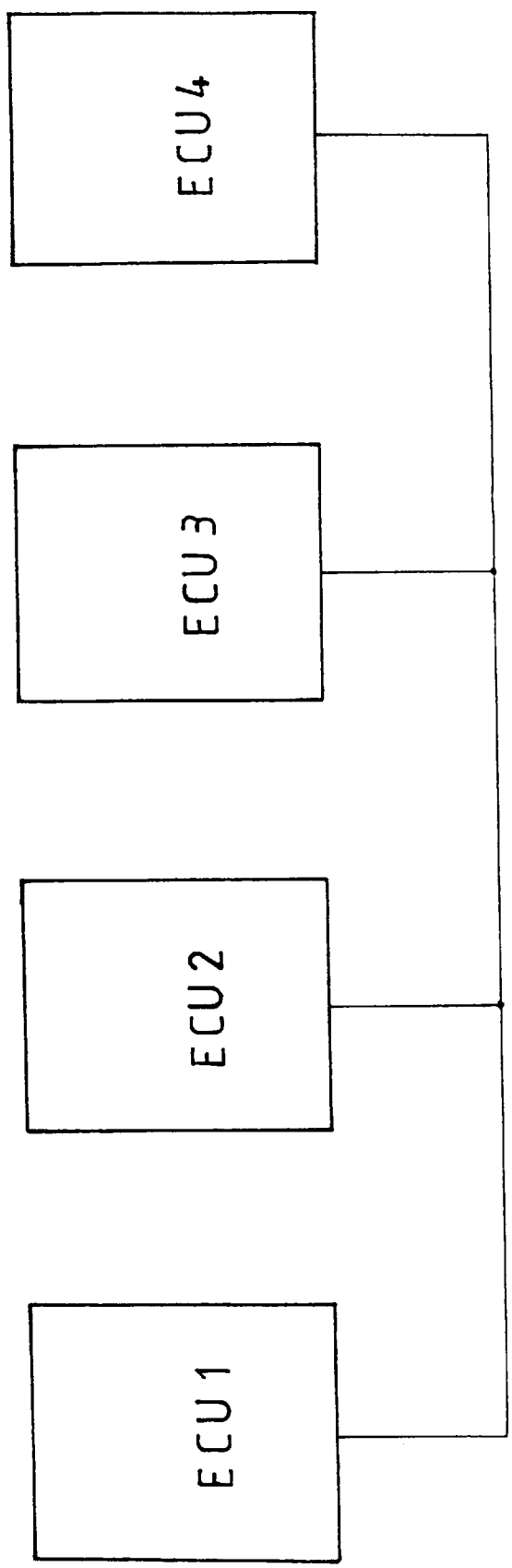

PROCESS FOR INFORMATION TRANSMISSION IN A BUS SYSTEM HAVING SEVERAL PARTICIPANTS

BACKGROUND OF THE INVENTION

The invention is directed to a process for information transmission and, more particularly, to a process for transmitting information entities serially between subscribers connected by a serial bus.

Increasingly, data processing technique makes use of networks of computers or the like. Different bus systems are known for these network functions. The information stream between a number of electronic components (for example, between control devices) also continues to increase in automobile technology. For example, the so-called CAN system (CAN=Controller Area Network) (cf. DE-OS 35 06 118) or ABUS system (ABUS=Automobile Bit-Serial Universal Interface) are presently used in motor vehicles for linking individual components. The objective of every communications system is to link individual components (subscribers) via bus lines so that they can communicate with one another via a central system or e.g. via an externally connected tester. In this respect there is a special case of communications relating to diagnostics. In this case an external testing device addresses one or more control devices for interrogating corresponding states. Due to competing subscribers, the problem of so-called bus arbitration occurs regardless of the type of bus system. Thus, it must be ensured that no more than one subscriber occupies the bus at one time, since this would lead to inaccurate information and/or loss of information. Like the Carrier Sense Multiple Access with Collision Detection (CSMA/CD) which is used to manage an ETHERNET bus, the aforementioned systems (CAN, ABUS) also work on the principle of priority ranking and checking of the transmitted information. In the case of CSMA/CD mentioned above, the information is lost in the event of collision and must be retransmitted. In CAN and ABUS, the message with higher priority is transmitted and the message with lower priority must be retransmitted. The known processes require independent hardware for bus connection and management.

SUMMARY OF THE INVENTION

The process for serially transmitting information entities over a serial bus between subscribers (ECU1 to ECU4) at a common transmission rate for all subscribers includes providing the information entities with a start bit (Sta) at a beginning of each of the information entities; waiting to transmit the information entities on the bus from each subscriber until after a bus monitoring time period ($T_U$) assigned to each subscriber has elapsed; setting a flag after one of the subscribers receives one of the information entities; monitoring a logic state of the serial bus during a bus monitoring time period ($T_U$) at a monitoring rate sufficiently high so that receipt of each information entity is detected during reception of its start bit (Sta); each subscriber determining the state of the flag after expiration of its bus monitoring period ($T_U$); and only then transmitting the information entities from a subscriber if the subscriber does not detect that the flag is set during its bus monitoring time period ($T_U$).

The process according to the invention has the advantage over the prior art that a loss of data and, normally, a retransmission of data are avoided. Further, it requires only a small additional expenditure, if any, on circuitry. For this purpose, each subscriber checks whether or not the bus is occupied and transmits information only when it is not occupied, every subscriber waits for a bus monitoring period before transmitting information, and the information is transmitted by the subscriber after the bus monitoring period only when no transmission of information is detected on the bus within the subscriber's bus monitoring period. Thus, the substantial difference compared to the prior art consists in that no priorities are allotted. Accordingly, it is not necessary to determine a transmission sequence. This is important, for example, if the individual components (subscribers) of a vehicle are manufactured by different producers and, insofar as this is the case, could be coordinated only with difficulty with respect to a transmission sequence. The procedure according to the invention, i.e. the interrogation of the bus, avoids these difficulties in coordinating various devices from different manufacturers.

According to one feature of the invention the subscribers have a common transmission rate for transmission of information. This enables reciprocal adaptation and the individual subscribers can determine in a particularly simple manner whether or not the transmission of a message of a subscriber containing at least one byte has already been concluded. Accordingly, the common transmission rate is a precondition for functional addressing, i.e. for the simultaneous response of a plurality of control devices.

In a particularly advantageous manner the bus is designed as a serial bus.

To detect status, i.e. whether or not information is being transmitted on the bus, the subscribers preferably monitor the bus for the logical "0" state or logical "1" state. The subscribers can preferably monitor the bus for transitions from an idle state, logical "1", to an active state, logical "0", insofar as they are activated for information transmission. Thus, if no information is to be transmitted, this monitoring is unnecessary.

According to a particularly preferred embodiment example, the bus monitoring period is at least equal to the sum of a byte period and an interbyte period. The byte period is the duration of a byte of the information containing at least one byte and the interbyte period is the maximum time elapsing between two bytes of information. Thus, the sum of the byte period and interbyte period defines a period of time after which it may safely be assumed that the previously transmitting subscriber has concluded a transmission. Accordingly, after the sum of the byte period and interbyte period has expired, it is then possible for the subsequent subscriber to transmit without colliding with the previous subscriber.

Due to the serial processing in a serial bus system, it is inevitable that every subscriber will experience a time delay $\Delta T$ between the detection of "bus free" status and the transmission of the first byte of information. However, there may be a collision between two subscribers during this delay time $\Delta T$, particularly when one subscriber is already transmitting and the other subscriber is receiving its transmission within the delay period $\Delta T$. Although the delay time is only long enough for a few assembler commands so that a collision is relatively unlikely, collision or interference between information entities transmitted by different subscribers can nevertheless not be ruled out. To remedy this problem of collision, each subscriber monitors the transmission of its information by "listening in" and, in the event of multiple concurrent transmission of different information (collision) from at least two subscribers, there is a reciprocal influencing of information which can be detected by listening in. Consequently, each subscriber can determine by listening in whether it is the only subscriber to transmit its information to the bus or whether a collision occurred.

In the event of a collision detected by the colliding subscribers which are listening in, the colliding subscribers preferably interrupt their transmission and reattempt to gain access to the bus so as to transmit their information only after the expiration of waiting periods of different duration. The duration of these waiting periods is preferably determined by a random number generator.

It is further provided that a flipflop is used to detect a start bit on the bus. This start bit is the first bit of every byte of information transmitted by a subscriber. It should also be mentioned that every byte ends with a stop bit.

According to a preferred embodiment example, the flipflop is associated with a microcontroller. It is possible to connect the flipflop to an input of the microcontroller. Alternatively, the flipflop may also be integrated in the microcontroller.

Finally, with respect to the start bit it is also possible for at least one subscriber to set a flag when detecting this start bit. When set, this flag suppresses transmission of information by the subscriber in question. The subscriber setting the flag is preferably a subscriber following a subscriber who is already transmitting.

Further, the invention is directed to a control device for processes to be controlled, particularly in engines and/or switching devices in motor vehicles, which control device is connected to a bus and transmits information. The control device has a control circuit which checks the bus during the bus monitoring period prior to transmitting information to determine whether it is free and initiates transmission if it senses within the bus monitoring period that the bus is not occupied (no transmission of information) by other control devices/subscribers.

The bus monitoring period carried out by the control circuit is at least equal to the sum of a byte period and an interbyte period. The byte period is the duration of a byte of the information containing at least one byte and the interbyte period is the maximum period of time elapsing between two bytes of information.

Further, the control circuit ensures that the information transmitted by a subscriber/control device is preceded by a start bit and followed by a stop bit.

The invention is further directed to a serial bus system with a plurality of subscribers (control devices) for processes to be controlled, particularly in engines and/or switching devices in motor vehicles. Each control device has a control circuit which checks the bus during a bus monitoring period prior to transmission of information to see that the bus is free and initiates transmission of information when it has been determined within the bus monitoring period that the bus is not occupied (no transmission of information) by other control devices/subscribers.

The subscribers preferably have a common transmission rate in the aforementioned bus system.

Due to the serial operating mode, a delay occurs between the detection of "bus free" and the transmission of the first byte of information for each subscriber in the bus system mentioned above.

In a special embodiment form, every subscriber monitors the transmission of its information by "listening in" and, when at least two subscribers are transmitting information at the same time, there is a reciprocal influencing of information which can be detected by listening in. If such a collision is determined, the transmission of information on the bus system is interrupted. The individual subscribers try again to access the bus only after the expiration of waiting periods of different duration.

BRIEF DESCRIPTION OF THE DRAWING

The objects, features and advantages of the present invention will now be illustrated in more detail by the following detailed description, reference being made to the accompanying drawing in which:

FIG. 3 shows a basic circuit for locating a start bit of information;

FIG. 4 illustrates another embodiment example corresponding to FIG. 3;

FIG. 5 illustrates a final embodiment example corresponding to FIG. 3;

FIG. 6 shows a block diagram of a serial bus system.

DESCRIPTION OF THE PREFERRED EMBODIMENTS

The transmission of information on a serial bus system having a plurality of subscribers, namely subscribers ECU 1 and ECU 2, is explained in more detail with reference to FIG. 1. It is assumed that the subscribers ECU 1 and ECU 2 have the same transmission rate, e.g. 10.4 kBD.

Figure 1:
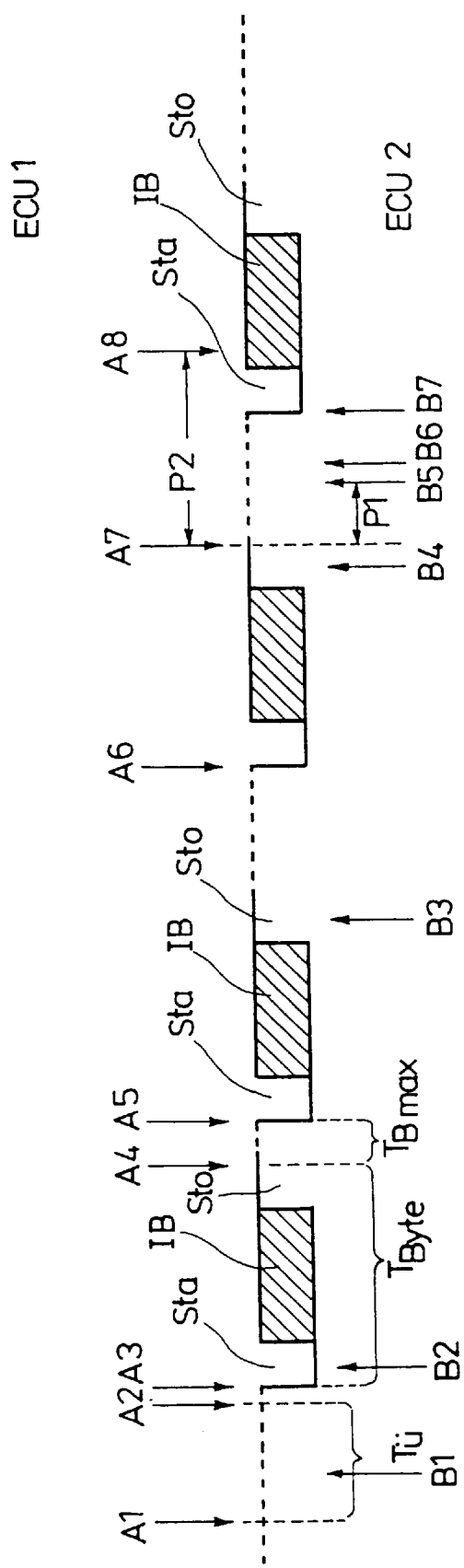
FIG. 1 shows a time chart for transmission of information of two subscribers (ECU 1, ECU 2) of a bus system.

The chart in FIG. 1 illustrates the status of the bus. An idle state is represented by logical "1" and an active state by logical "0". The two subscribers ECU 1 and ECU 2 monitor the bus for transitions from the idle state "1" to the active state "0" as soon as they are polled by a central system, not shown, for the transmission of information. This monitoring is effected at least for the duration of a bus monitoring period $T_{\ddot{U}}$. The bus monitoring period $T_{\ddot{U}}$ is made up of two time periods, i.e. a byte period $T_{Byte}$ and an interbyte period $T_{Bmax}$. The byte period $T_{Byte}$ is the duration of a byte of information containing at least one byte which is transmitted by one of the subscribers ECU 1, ECU 2. The interbyte period $T_{Bmax}$ is the maximum time elapsing between two bytes of information. For example, a message transmitted by a subscriber ECU 1 or ECU 2 can contain five bytes, each byte being assigned a start bit Sta at the start and a stop bit Sto at the end.

According to FIG. 1, it is assumed that subscriber ECU 1 starts at time A1 by monitoring the status of the bus. This means that it has already been polled previously for transmission of information by the aforementioned central system. At time A2, the subscriber ECU 1 checks whether or not a start bit occurred during time A1–A2. Since this did not occur, it sensed the bus as idle at this time. At time A3, the subscriber ECU 1 transmits the first byte of information. This begins with a start bit Sta. Information bits IB follow the start bit Sta. At the end of the first byte (time A4), the bus assumes the "1" status again. The byte ends with a stop bit Sto. The period between the times A3 and A4 corresponds to the byte period $T_{Byte}$ mentioned above.

At time A5, the second byte of information is started by the subscriber ECU 1. It repeats the process described above. It is assumed that the last byte of information of subscriber ECU 1 is started at time A6 so that the transmission of subscriber ECU 1 is concluded at time A7.

FIG. 1 also shows the behavior of a second subscriber ECU 2 of the bus system. The latter begins at time B1 by monitoring the bus. Thus, ECU 2 also transmits information when polled by the central system. Since this is a serial bus, collisions of messages of subscribers 1 and 2 must be prevented. At time B2, that is, after the bus monitoring period $T_{Ü}$ assigned to the subscribers has expired, the second subscriber ECU 2 detects the start bit Sta of subscriber ECU 1. As a result, subscriber ECU 2 interrupts the process, i.e. does not start transmitting information.

However, this subscriber remains in its monitoring state. That is, it checks whether or not the bus is occupied as do all other subscribers which may possibly be connected to the bus. In so doing, it will detect the second byte of subscriber ECU 1 at time B3. At time B4, subscriber ECU 2 detects the last byte of subscriber ECU 1 in a corresponding manner. At time B5, subscriber ECU 2 detects the end of the information of subscriber ECU 1. In this case, it can begin monitoring the bus again at time B6. Since it does not detect any transmission of information on the bus within the subsequent bus monitoring period $T_{Ü}$, it starts the first byte of its information at time B7.

To ensure that no collision occurs between the transmissions of the two subscribers ECU 1 and ECU 2, ECU 2 monitors the status of the bus after every byte transmitted by subscriber ECU 1. If the time elapsing after a byte is greater than the sum of the interbyte period $T_{Bmax}$ and the byte period $T_{Byte}$ without another byte of subscriber ECU 1 being received on the bus, it can start transmitting information. For this purpose, it waits at least for a time P2. This is a guarantee that the bus is now actually free and that the subscriber in question is not transmitting, for example, during a pause in a pending message from another subscriber.

The individual bytes of a message transmitted by a subscriber ECU 1 or ECU 2 are transmitted after the interbyte period $T_B$ without further checking the bus. The subscriber ECU 2, which is likewise ready to transmit shortly after subscriber ECU 1 as described above, detects that the bus is occupied based on the zero-to-one transition. Since the baud rate on the bus is known, the subscriber ECU 2 can listen in to the following bytes of the message of subscriber ECU 1 as already mentioned. However, these bytes need not be interrupted, i.e. the contents of the message need not be known. Rather, the subscriber ECU 2 decides on the basis of the sum of the two time periods, i.e. the byte period $T_{Byte}$ and the interbyte period $T_{Bmax}$, that the bus is idle when a time period of this length occurs and subscriber ECU 2 can start to transmit.

Of course, the invention is not limited to two subscribers ECU 1 and ECU 2, but can also be used with more than two subscribers in a corresponding manner.

Figure 2:
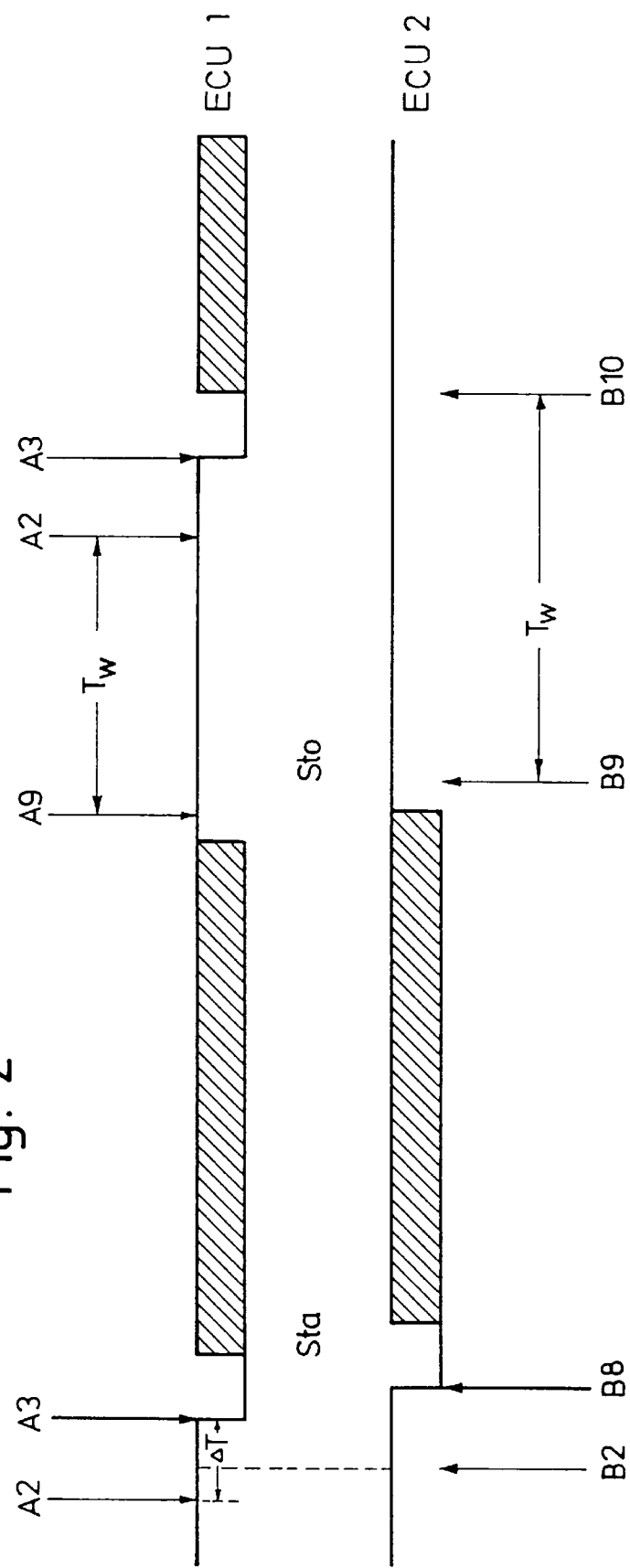
FIG. 2 shows a corresponding time chart illustrating a case of collision between two subscribers.

FIG. 2 shows that a delay $\Delta T$ occurs between the detection of "bus free" (time A2 of subscriber ECU 1) and the transmission of a byte (time A3), since the microprocessor in question can only operate serially. Within this time gap (time delay $\Delta T$), another subscriber (e.g. ECU 2) which has likewise detected "bus free" (time B2) can now transmit a byte (time B8) so that a collision occurs on the bus. However the length of this delay is such that only a few assembler commands can be made. Assuming that this time at which the different subscribers want to transmit is equally probable, the probability for the occurrence of a collision is given as the quotient of the duration of the time gap (time delay $\Delta T$) and the distance between the start bits of two transmitted bytes. This distance is the sum of the duration of a byte (byte period $T_{Byte}$) and the shortest possible interbyte period ($T_{Bmin}$). For example, in a typical case, a time delay of $\Delta T=4$ $\mu$s, $T_{Byte}=0.96$ ms (10.4 kBd, 10 bits) and $T_{Bmin}=5$ ms can be provided. This represents a collision probability of 0.07%, i.e. a collision will occur in one out of 1,428 cases.

Since there is a reciprocal influencing of the information of two subscribers transmitting at the same time, this collision can be detected by subscribers ECU 1 and ECU 2 by listening in to their own messages. All subscribers then interrupt their message at times A9 and B9 (FIG. 2) and exit from the bus. The intended recipient of the message has received a garbled message due to the reciprocal influencing. The recipient detects this as an error. It must now be ensured that the same case does not occur again when the message is retransmitted. For this purpose, each subscriber ECU 1 and ECU 2 is allotted a waiting period $T_W$ of different length.

FIG. 2 shows that the waiting period $T_W$ of subscriber ECU 1 is shorter than the waiting period $T_W$ of subscriber ECU 2, i.e. subscriber ECU 1 is the first to begin a retransmission of information after the interruption (time A9). The subscriber ECU 2 which is allotted the longer waiting period $T_W$ waits unit time B10 to start again and detects at time B10 that the bus is occupied. Therefore, it will wait until all of the information of subscriber ECU 1 has been transmitted and will only then start to transmit its own information.

The waiting periods $T_W$ of individual subscribers ECU 1, ECU 2 are preferably not constant, but rather are suggested by an internal random number generator. The start parameter can be an internal clock time (timer reading of a continuously running timer) or the unique subscriber address and/or the number of previous collisions.

Various possibilities for detecting a start bit Sta on the bus are shown in FIGS. 3 to 5. The aim in every case is the lowest possible computer loading of a microcontroller $\mu$C of the central system. A scanning of the bus is ruled out, since the reliable detection of a start bit requires a faster time than the time of a bit, which would result in a considerable computer loading.

For this reason, the information is preferably stored by a flipflop 50 according to FIG. 3. The input 51 of the flipflop 50 is connected to the bus, as is the input R×D of the microcontroller $\mu$C. The output 52 of the flipflop 50 is connected to an input $P_{in}$ of the microcontroller $\mu$C. A reset output R of the microcontroller $\mu$C leads to the flipflop 50. Consequently, the flipflop 50 is triggered by the serial reception line and the computer has a port for reading out and a port for resetting. Time C in the chart shown in FIG. 3 designates the detection of a start bit Sta.

This is shown in a corresponding manner in FIG. 4, where the detection of the start bit Sta is designated by D. In contrast to the embodiment example in FIG. 3, a flipflop is connected internally in the microcontroller $\mu$C subsequent to an external interrupt input 53.

FIG. 5 shows another solution for detecting a start bit. However, the start bit according to the chart is detected with a delay. The identification time is designated by E.

The solution according to FIG. 3 requires no additional expenditure on hardware. However, the computer must be provided with a serial interface with selectable baud rate so that it is also possible to detect information without a stop bit. During the bus monitoring phase, the baud rate is switched to the highest possible value (e.g. 187.5 kBd). If a subscriber (e.g. ECU 1) transmits a byte e.g. at 10.4 kBd, the receiver ECU 2 synchronizes on the start bit and signals the recipient of the byte after 9.5 bit periods (referring to the high baud rate). The contents are irrelevant. They may include, for example, a start bit, 8 information bits, and a stop bit. Subscriber ECU 2 now sets a flag. By analogy with the solution according to FIG. 3, the setting of a flag in the solution according to FIG. 5 corresponds to setting the flipflop. Subscriber ECU 2 now interrogates this flag before it transmits its own byte. The bus is sensed as occupied as long as the flag is set. If the flag is not set, the bus line is interrogated in addition: if it is in the logical "1" state, the bus is free. If the bus state is logical "0", information is being transmitted. However, this transmission has just started. The 9.5 bit periods have not yet expired so that the flag is not yet set.

In contrast to the priority processes of the prior art, the process according to the invention has the advantage that the transmission sequence need not be determined. The process according to the invention is more economical than the process according to the prior art as it does not require any special devices. The use of a simple flipflop is sufficient. The use of a conventional serial input and switching to a high baud rate makes any extra expenditure unnecessary.

FIG. 6 shows the block diagram of a serial bus system having e.g. four subscribers ECU 1 to ECU 4. For example, these subscribers may be control devices for processes to be controlled, in particular in engines and/or switching devices in motor vehicles. Every control device is provided with a control circuit which transmits information according to the process according to the invention.

We claim:

1. Process for serially transmitting information entities over a serial bus between a plurality of subscribers (ECU1 to ECU4) connected to said serial bus at a common transmission rate for all of said subscribers, each of said subscribers transmitting said information entities at said common transmission rate, said process comprising the steps of:
   a) providing each of said information entities with a start bit (Sta), said start bit (Sta) being transmitted on said serial bus at a beginning of transmission of each of said information entities;
   b) prior to transmitting said information entities on said serial bus each of said subscribers transmitting said information entities waits a predetermined bus monitoring time period prior to said transmitting;
   c) setting a flag after one of said subscribers (ECU1 to ECU4) receives one of said information entities, said flag being set indicating receipt of said information entity by said subscriber;
   d) monitoring a logic state of said serial bus with each of said subscribers during said bus monitoring time period ($T_U$) thereof at a monitoring rate sufficiently high so that receipt of one of said information entities is immediately detected during receipt of said start bit (Sta) of said information entity so detected, said start bit (Sta) being transmitted at said common transmission rate;
   e) each of said subscribers (ECU1 to ECU4) determining a state of said flag after expiration of said bus monitoring time period ($T_U$) for said subscriber determining said state of said flag; and
   f) only transmitting said information entities from one of said subscribers if said subscriber does not detect that said flag is set during said bus monitoring time period ($T_U$) of said subscriber.

2. Process as defined in claim 1, wherein each of said subscribers monitors said bus for transitions from an idle state of said bus to an active state of said bus, wherein said bus is not free for said information transmission during said active state and in said active state of said bus said bus is in a logic "0" state and in said idle state said bus is in a logic "1" state.

3. Process as defined in claim 2, further comprising receiving each of said information entities with said subscriber transmitting each of said information entities and terminating transmission of each of said information entities when said information entities become garbled by interference because of simultaneous transmission of at least two of said information entities on said bus by at least two of said subscribers.

4. Process as defined in claim 3, further comprising accessing said serial bus again by said subscribers involved in said simultaneous transmission only after waiting time periods ($T_U$) of different durations for each of said subscribers involved in said simultaneous transmission.

5. Process as defined in claim 4, further comprising determining said different durations of said waiting time periods according to an address of said subscriber waiting for expiration of said waiting time period.

6. Process as defined in claim 4, further comprising determining said different durations of said waiting time periods according to a number of said information entities involved in said simultaneous transmission.

7. Process as defined in claim 4 further comprising determining said different durations of said waiting time periods by a random number generator.

8. Control device comprising a microprocessor, a serial bus over which information entities are serially transmitted, at least one serial data device connected to the serial bus and having means for setting a definite transmission rate over said serial bus, means for providing each of said information entities with a start bit to begin transmission of said information entity, means for waiting a bus monitoring time period prior to transmission of said information entities over said serial bus, means for setting a flag to signal reception of one of said information entities thereby, means for monitoring said serial bus during said bus monitoring time period at such a high rate that receipt of said information entities is already detected during receipt of said start bit which is sent at said definite predetermined data transmission rate, means for determining a state of said flag after expiration of the bus monitoring time period, and means for transmitting said information entities on said serial bus only when said flag is not set during said bus monitoring time.

9. Control device as defined in claim 8, wherein said microprocessor has means for additionally determining a logic state of said serial bus if said flag is not set after expiration of said bus monitoring time and said subscribers contain means for determining that said serial bus is free and said bus is not free for transmission of said information entities during an active state thereof and in said active state of said bus, said bus is in a logic "0" state and in said idle state in which said bus is not in said active state, said bus is in a logic "1" state.

10. Control device as defined in claim 8, further comprising means for selecting said bus monitoring time period so that said bus monitoring time period is at least equal to a sum of a byte time period ($T_{Byte}$) and an interbyte time period ($T_{Bmax}$), the byte time period being equal to a duration of a byte of information containing at least one bit and said interbyte time period ($T_{Bmax}$) being equal to a maximum time elapsing between two of said bytes of information.

11. Control device as defined in claim 8, further comprising means for detecting garbling of said information entities due to a simultaneous transmission of said information entities from different ones of said subscribers.

12. Control device as defined in claim 8, further comprising means for controlling an internal combustion engine.

* * * * *